United States Patent [19]

Dwivedy

[11] Patent Number: 4,898,751

[45] Date of Patent: Feb. 6, 1990

[54] COMPOSITION AND METHOD FOR PREVENTION OF ADHESION OF PARTICULATE MATTER TO CONTAINERS

[75] Inventor: Shailesh G. Dwivedy, St. Louis, Mo.

[73] Assignee: Petrolite Corporation, St. Louis, Mo.

[21] Appl. No.: 851,647

[22] Filed: Apr. 14, 1986

Related U.S. Application Data

[63] Continuation-in-part of Ser. No. 371,874, Apr. 26, 1982, abandoned.

[51] Int. Cl.$^4$ .......................... B05D 7/22; C08L 91/06
[52] U.S. Cl. ..................................... 427/230; 106/230; 427/239; 427/388.5; 524/487
[58] Field of Search ..................... 427/230, 239, 388.5, 427/388.1; 106/2, 271, 285, 230; 524/487

[56] References Cited

U.S. PATENT DOCUMENTS 4,199,622  4/1980  Kokumai et al. .................... 427/239
4,312,901  1/1982  Kekish et al. ........................ 427/239

Primary Examiner—Janyce Bell
Attorney, Agent, or Firm—Robert E. Wexler

[57] ABSTRACT

This invention relates to methods and compositions of matter for inhibiting and/or preventing the formulation of adhesion of materials such as coal, coke, mineral ores, taconite, glass and others to the container (railcars, silo, hopper bins, etc.) walls due to freezing temperatures in winter and/or excessive moistures during the rest of the year.

4 Claims, No Drawing Sheets

COMPOSITION AND METHOD FOR PREVENTION OF ADHESION OF PARTICULATE MATTER TO CONTAINERS

This is a continuation-in-part of co-pending application Ser. No. 06/371,874 filed Apr. 26, 1982, now abandoned.

This invention relates to methods and compositions of matter for inhibiting and/or preventing the adhesion of materials such as coal, coke, mineral ores, taconite, glass and similar solid, particulate matter to containers, such as the walls of railcars, silos and hopper bins, due to freezing temperatures in winter and excessive moisture during the rest of the year.

There are situations where excessive build-up of materials such as coal, taconite, coke and mineral ores is disadvantageous and problematic. The major problems encountered due to excessive material build-up, to mention a few, are: uneven weight distribution in railcarrs causing derailments; materials freezing in silos and/or hopper bin chutes eventually plug-up the chutes and cause delays in regular plant operations; carry-back of materials to the loading stations result in reduced carrying capacities of the transport vehicles such as the railcars; costs incurred due to incomplete loads received due to frozen material being carried back to the suppliers; lost production.

The surface moisture on the particulate solids freezes, thus, bonding the solid materials to the container (metal, cement) walls. Excess moisture on "fine" particulate matter enhances the adhering problem even in warm weather conditions. The adhesivity (holding or bonding) is directly influenced by both the amount of fines (particle size) and the surface moisture content. The retention or accumulation is objectionable because it makes the dumping or unloading of railcars, silos, hopper bins, and the like, extremely difficult. Unloading of cleaning accumulated solids in expensive and time consuming, resulting in production delays and hence higher unit costs. Several techniques, such as spraying hydrocarbons (oils), calcium chloride, silicone solutions and glycols, have been used with limited success. The effectiveness of using hydrocarbons has been very poor and has also created safety problems by making walking surfaces slippery. Spraying calcium chloride solutions greatly enhances the corrosion of metals such as steel, making it less desirable. Silicones have shown some effectiveness but have prohibitive costs.

All the above mentioned factors point to the need for developing an effective and economic method of treating railcars, silos, hopper bins and similar containers to prevent adhesion of particulate matter on the walls and floor thereof.

The present invention is directed to compositions and method for treatment of containers such that solid particulates flow better along the metal surfaces of the containers, upon the walls and floor of which there has been formed a hydrophobic coating. The invention is especially adapted to maintain the walls of railcars, silos, transfer chutes and similar containers non-sticking to water, and hence maintain the free flowing properties of the solids at the solids/wall interface. The benefits of the invention are achieved by contacting, such as by spraying, container walls with a composition comprising a solution of (A) a wax and (B) a resin. The invention is useful in the treatment of containers made of metals, cement, concrete, glass, plexiglass and the like, where water drainage is desirable. The invention is useful in storage, transportation and transfer of materials like coal, coke, iron ore, glass, wood, taconite pellets, dry cement mix, and other minerals where problems might occur due to either freezing of moisture or excessive moisture on the surface of above-mentioned materials. The compositions of this invention are especially useful when sprayed on the interior of coal cars.

The solvent used to dissolve the wax/resin compositions of the invention is a petroleum hydrocarbon. Typical petroleum hydrocarbon solvents which are useful include mineral oils, kerosene, naptha, xylene, toluene, cyclohexane, hexane, and the like. Keroses or naptha is preferred. Mixtures of these hydrocarbons may also be employed.

The composition of the invention comprises a wax which is soluble in the hydrocarbon solvent and a resin, preferably a petroleum hydrocarbon resin, compatible with the petroleum hydrocarbon solvent and the wax, to give rigidity to the coating.

The amount of the composition which is applied to surfaces and the ratio of each ingredient within the composition may be varied within wide limits. The percent by weight ratio of wax to resin in the composition may vary from about 1:2 to about 2:1, preferably about 1:1, however the amount of wax used should be the minimum required to enhance water drainage and also aid the flow of solid particulates by reducin shear strength of ice between the metal surface and the solid particulates. The amount of the composition of the invention to be applied to the containing vessel walls depends on the type and amount of area to be coated, type of solids loaded in the vessel their densities, moisture content, exposure time and also the expected life of the coating. Thus, the composition is applied in an amount of from about 1 to about 100 mls./ft$^2$, preferably from about 15 to about 75 mls./ft$^2$, especially from about 25 to about 50 mils./ft$^2$.

This invention also relates to a method of inhibiting and/or preventing the adhesion of materials, for example particulate materials, to a container surface under freezing temperatures and/or excessive moisture which comprises coating the surface with a solution of natural or synthetic wax and a resin. The function of wax is to coat the surface of the container with a hydrophobic coating and the function of the resin is to strengthen the wax coating and to make the coating more adhesive.

Any suitable wax which will form a hydrophobic coating can be employed in this invention. Thus, animal, vegetable, mineral and synthetic waxes may be used as may be mixtures thereof.

The following are illustrative types of waxes which may be employed:

| Source | Examples | Compositions |
|---|---|---|
| Mineral waxes | Paraffin | 26–30 Carbon atom molecules of aliphatic hydrocarbons |
| | Microcrystalline | 41–50 Carbon atom molecules of branched-chain hydrocarbons |
| | Oxidized microcrystalline | Hydrocarbons, esters, fatty acids |
| | Montan | wax acids, alcohols, esters, ketones |
| | Hoechst | acids, esters |
| | Ozokerite | High mol. wt. aliphatic and alkenyl hydrocarbons |
| Vegetable waxes | Carnauba | Complex alcohols, hydrocarbons, resins: |
| | Esparto | Hydrocarbons |
| | Flax | Fatty acid esters, hydrocarbons |

| Source | Examples | Compositions |
|---|---|---|
| | Sugarcane wax | Hydrocarbons, aldehydes, alcohols |
| | Candelila | Hydrocarbons, acids, esters, alcohols resins |
| Animal waxes | Beeswax | Hydrocarbons, acids, esters, alcohols |
| Synthetic waxes | Fischer-Tropsch | Saturated and unsaturated hydrocarbons |
| | Polyolefins | Hydrocarbon |

The preferred waxes are POLYWAX®, a linear polyethylene wax, and VYBAR®, a polymerized α-olefin prepared by polymerizing α-olefins under free radical conditions at low pressures (POLYWAX and VYBAR are trademarks of Petrolite Corporation). The polymers are unique in that although α-olefin polymers generally have higher molecular weight, greater viscosity and greater hardness than the starting monomer, VYBAR polymers generally have lower melting points and congealing points than the starting monomer. The monomers employed are primarily alpha-olefins of the formula $RCH=CH_2$ where R is an alkyl group having about 4 to 50 carbon atoms or is a mixture of alpha-olefins, vinylidene compounds, internal olefins and saturated hydrocarbons. Because alpha-olefins are primarily employed, this term is often used to indicate both alpha-olefins and mixtures of various combinations of alpha-olefins, vinylidenes, internal olefins and saturates.

A wide variety of resins and mixtures thereof can be employed in this invention provided the resin is compatible with the wax and solvent and strengthens the coating and makes it more adhesive.

In general, the resins which are suitable for use in this invention are solid or semi-solid organic-productts of natural and/or synthetic origin, generally non-crystalline and of medium to high molecular weight with no definite crystalline melting point and which are water-insoluble but soluble in petroleum hydrocarbon solvents.

As is well known, there are many chemical classes of resins and under each class there are hundreds of resins which differ slightly or greatly from each other.

In general, the definition of the term "resin" as employed herein is that generally employed in the paint, varnish and packaging industry with the proviso that they can perform the function stated herein. Such resins are described for example in many well known publications in the paint, varnish and packaging fields and are listed in Tables I and II.

TABLE I

| RESINS | |
|---|---|
| Chemical Type | Branded Product |
| Rosin (wood, gum or sulphate) | Rosin |
| Esters of resin | Abalyn |
| Hydrogenated rosin | Hercules Staybelite |
| Esters of hydrogenated rosin | Hercules Staybelite |
| Dimerized rosin | Dymerex |
| Esters of dimerized rosin | Hercules Pentalyn K |
| Disproportionated rosin | Nilox U |
| Esters of disproportionated rosin | Cumar MN2½ |
| Coumarone-indene | |
| Alpha methyl styrene/vinyl toluene (including substituted monomers) | Plecotex 120 |
| Terpene polymers | Nirez 1085 |
| Styrene-indene-isoprene terpolymers | Velsicol XI, 30 |
| Terpene phenolics | LTP 100, Penn. Ind |
| Hydroabietyl alcohol | Abitol |
| Esters of hydroabietyl alcohol | Cellolyn 21 |

The following TABLE II illustrates typical properties of commercial examples of poly-α-olefins.

TABLE II

| Property | Test Method | Typical Properties Units | VYBAR 260 | VYBAR 103 | VYBAR 825 |
|---|---|---|---|---|---|
| Melting Point | ASTM D-36 Mod. | °F. (°C.) | 124 (51) | 162 (72) | N/A |
| Pour Point | ASTM D-97 | °F. (°C.) | N/A | N/A | $< -30 (< -34.4)$ |
| Viscosity | | | | | |
| @ 32° F. (0° C.) | ASTM D-2669 | Centipoise | — | — | 6400 |
| @ 50° F. (10° C.) | | | — | — | 2800 |
| @ 100° F. (37.8° C.) | ASTM D-3236 | | — | — | 530 |
| @ 150° F. (65.6° C.) | | | 915 | — | 157 |
| @ 210° F. (98.9° C.) | | | 350 | 360 | 54 |
| @ 250° F. (121° C.) | | | 180 | 185 | 31 |
| @ 300° F. (149° C.) | | | 104 | 107 | 18 |
| Penetration | | | | | |
| @ 77° F. (25° C.) | ASTM D-1321 | 0.1 mm | 13 | 5 | N/A |
| @ 110° F. (43° C.) | | | 110 | 20 | |
| @ 130° F. (54° C.) | | | — | 57 | |
| @ 140° F. (60° C.) | | | — | 153 | |
| Density | | | | | |
| @ 75° F. (24° C.) | ASTM D-1168 | grams/cc | 0.90 | 0.92 | 0.86 |
| @ 200° F. (93° C.) | | | 0.79 | 0.77 | — |
| Iodine Number | ASTM D-1959 | cg $I_2$/g sample | 15 | 14 | 30 |
| Color | ASTM D-1500 | | 0.5 | 0.5 | 0.0 |

N/A Not Applicable

The invention is illustrated by the following examples. The enhanced drainage properties of metal (aluminum, iron) surfaces and also the improved flow properties of solids is effected in these examples which are presented by way of illustration and not of limitation. The following formulations were employed.

| Formulation I | |
|---|---|
| | Wgt. % |
| Naptha | 70.0 |
| VYBAR 825 wax | 15.0 |
| (Sold by Petrolite Corporation) | |
| Exxon ESCOREZ* 1102 Petroleum Hydrocarbon resin | 15.0 |
| (Sold by Exxon Corporation) | |

| Formulation II | |
|---|---|
| | Wgt. % |
| Kerosene | 70.0 |
| VYBAR 825 wax | 15.0 |

| -continued | |
|---|---|
| Exxon ESCOREZ 1102 Petroleum Hydrocarbon resin | 15.0 |

*Registered Trademark of Exxon Corporation

EXAMPLE 1

To illustrate the enhanced drainage of water (i.e., less water retained on the metal surfaces), a steel plate 4 inches long and 4 inches wide was used. The plate was suspended by a hook on a balance beam, to obtain its tare weight. The plate was then immersed in water and removed. The area wetted by the water was calculated as 14 sq. inches. The weight of water retained was recorded. The plate was then coated with Formulation I and allowed to dry. The plate was suspended as before, immersed in water and removed. The weight of water retained was noted. The plate coated with Formulation I facilitated a 97% increase in drainage of water as compared to the untreated plate under identical conditions.

Similar results were obtained with Formulation II.

EXAMPLE 2

Schedule 40 iron pipe cylinders, 4 inches diameter and 4 inches high, were used in an experiment to illustrate shear strength reduction or easy dump capabilities. Coal of a particle size of about ¾" and having varying moisture levels, 8 to 18 percent, was used in this example. The moist coal was loaded into treated and untreated pipe cylinders. The samples were then frozen at 0° F. for 24 hours. After that the plug of coal was pushed out of the pipe. The shear (strength) force was recorded on a pressure gauge. Results of the experiment showed considerable reduction in shear strength, as shown below.

| | Shear Strength, Psi | Percent Reduction |
|---|---|---|
| Untreated Cylinder | 1280 | — |
| Cylinder treated with Formulation I | 595 | 53.5 |

EXAMPLE 3

Formulation I was sprayed on railcars hauling taconite pellets. Comparison of treated and untreated cars after unloading showed cleaner dumping of treated cars. Cars treated with Formulation I retained 30 to 40 percent less pellets as compared to the untreated cars. This clearly demonstrates the capacity of the composition of the invention as an aid to material flow under adverse conditions.

What is claimed is:

1. A composition useful in coating surfaces to inhibit or prevent solid particulates from adhering to such surfaces which comprises a polymeric poly-α-olefin wax and a resin in a hydrocarbon solvent, the weight ratio of poly-α-olefin wax to resin being from about 1:2 to about 2:1.

2. The composition of claim 1 wherein said ratio is about 1:1.

3. A method of inhibiting or preventing solid particulates from adhering to surfaces which comprises coating such surfaces with a composition comprising a polymeric poly-α-olefin wax and a resin in a hydrocarbon solvent, the weight ratio of poly-α-olefin wax to resin being from about 1:2 to about 2:1.

4. The method of claim 3 wherein said ratio is about 1:1.

* * * * *